(12) United States Patent
Yamamoto et al.

(10) Patent No.: US 6,729,129 B2
(45) Date of Patent: May 4, 2004

(54) EXHAUST GAS PURIFYING SYSTEM

(75) Inventors: Shinji Yamamoto, Kanagawa-ken (JP); Masahiro Takaya, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/265,688

(22) Filed: Oct. 8, 2002

(65) Prior Publication Data
US 2003/0079468 A1 May 1, 2003

(51) Int. Cl.$^7$ ................................................. F01N 3/00
(52) U.S. Cl. ............................ 60/297; 60/299; 60/300; 422/170; 422/171; 422/177
(58) Field of Search .......................... 60/297, 299, 300, 60/301, 311, 295, 284; 422/169, 170, 171, 177

(56) References Cited

U.S. PATENT DOCUMENTS

| | | | |
|---|---|---|---|
| 5,315,824 A | | 5/1994 | Takeshima |
| 5,884,473 A | * | 3/1999 | Noda et al. ............... 60/274 |
| 5,914,090 A | * | 6/1999 | Gottberg ............... 422/171 |
| 6,029,441 A | * | 2/2000 | Mizuno et al. ............... 60/274 |
| 6,112,520 A | * | 9/2000 | Kaiho et al. ............... 60/303 |
| 6,113,864 A | | 9/2000 | Kueper et al. |
| 6,155,044 A | | 12/2000 | Kaiho et al. |
| 6,192,679 B1 | | 2/2001 | Nakamura et al. |
| 6,334,306 B1 | * | 1/2002 | Mori et al. ............... 60/297 |
| 6,447,735 B1 | | 9/2002 | Yamanashi et al. |

FOREIGN PATENT DOCUMENTS

| | | |
|---|---|---|
| EP | 0 592 713 A1 | 4/1994 |
| EP | 1 068 892 A2 | 1/2001 |
| EP | 1 270 887 A2 | 1/2003 |
| JP | 2-56247 | 2/1990 |
| JP | 5-59942 | 3/1993 |
| JP | 6-74019 | 3/1994 |
| JP | 6-142457 | 5/1994 |
| JP | 7-96183 | 4/1995 |
| JP | 7-102957 | 4/1995 |
| JP | 7-144119 | 6/1995 |
| JP | 7-332073 | 12/1995 |
| JP | 11-81999 | 3/1999 |
| JP | 2000-8834 | 1/2000 |
| JP | 2000-45751 | 2/2000 |

OTHER PUBLICATIONS

Yamamoto et al., "In–Line Hydrocarbon (HC) Adsorber System for Reducing Cold–Start Emissions", *SAE Technical Paper Series*, Mar. 6–9, 2000, 11 pages, Society of Automotive Engineers, Inc.
Patent Abstracts of Japan, vol. 2000, No. 02, Feb. 29, 2000; JP 11–324662, Nov. 26, 1999.
Patent Abstracts of Japan, vol. 1997, No. 02, Feb. 28, 1997; JP 8–284646, Oct. 29, 1996.

* cited by examiner

*Primary Examiner*—Binh Tran
(74) *Attorney, Agent, or Firm*—Foley & Lardner

(57) ABSTRACT

An exhaust gas purifying system, at least including, on an exhaust gas passage for gas exhausted from an engine, a first HC-trap-catalyst arranged on an upstream side, a second HC-trap-catalyst arranged on a downstream side, and a heat capacitor arranged between the first HC-trap-catalyst and the second HC-trap-catalyst. Each of the heat capacitor and the second HC-trap-catalyst has a honeycomb carrier, and a ratio $Gt/Gh_2$ of a geometric surface area $Gt$ of the honeycomb carrier of the heat capacitor to a geometric surface area $Gh_2$ of the honeycomb carrier of the second HC-trap-catalyst is in a range of 1 to 5.

14 Claims, 11 Drawing Sheets

SYSTEM NO.1

SYSTEM NO.5

FIG.9

| Catalyst NO. | β-zeolite ratio Si/2Aℓ | Adsorbent (g/L) | Pt (g/L) | Pd (g/L) | Rh (g/L) | BaO (g/L) | Numbers of meshes (cpsi) | Thickness of wall (mill) | Volume of catalyst (L) | Geometric surface area (cm²/cm³) |
|---|---|---|---|---|---|---|---|---|---|---|
| 1 | 40 | 350 | 0.71 | 1.88 | 0.24 | 6.7 | 300 | 6 | 0.75 | 24.1 |
| 2 | — | — | — | 2.35 | 0.47 | 2.7 | 900 | 2 | 0.5 | 43.6 |
| 3 | 40 | 300 | 0.71 | 1.88 | 0.24 | 6.7 | 200 | 10 | 0.5 | 19.0 |
| 4 | — | — | 1.18 | — | 0.24 | — | 900 | 2 | 0.5 | 43.6 |
| 5 | 40 | 300 | 0.71 | 1.88 | 0.24 | 6.7 | 200 | 10 | 0.75 | 19.0 |
| 6 | 40 | 300 | 0.71 | 1.88 | 0.24 | 6.7 | 200 | 10 | 1.0 | 19.0 |
| 7 | 40 | 300 | 0.71 | 1.88 | 0.24 | 6.7 | 200 | 10 | 1.5 | 19.0 |
| 8 | — | — | 1.18 | — | 0.24 | — | 900 | 2 | 0.75 | 43.6 |
| 9 | — | — | 1.18 | — | 0.24 | — | 900 | 2 | 1.0 | 43.6 |
| 10 | — | — | 1.18 | — | 0.24 | — | 900 | 2 | 1.25 | 43.6 |
| 11 | — | — | 1.18 | — | 0.24 | — | 900 | 2 | 1.5 | 43.6 |
| 12 | — | — | 1.18 | — | 0.24 | — | 1200 | 2 | 0.5 | 49.7 |
| 13 | — | — | 1.18 | — | 0.24 | — | 600 | 4 | 0.5 | 34.5 |
| 14 | 40 | 300 | 0.71 | 1.88 | 0.24 | 6.7 | 300 | 6 | 0.5 | 24.1 |
| 15 | 40 | 300 | 0.71 | 1.88 | 0.24 | 6.7 | 400 | 4 | 0.5 | 28.8 |
| 16 | — | — | 1.18 | — | 0.24 | — | 100 | 17 | 0.5 | 13.1 |
| 17 | 40 | 300 | 0.71 | 1.88 | 0.24 | 6.7 | 900 | 2 | 0.5 | 43.6 |
| 18 | — | — | 1.18 | — | 0.24 | — | 900 | 2 | 3.0 | 43.6 |
| 19 | — | — | 1.18 | — | 0.24 | — | 200 | 10 | 3.0 | 19.0 |
| 20 | — | — | 1.18 | — | 0.24 | — | 200 | 10 | 1.0 | 19.0 |

FIG.10A

| Example NO. | System NO. | Used catalyst NO. Catalyst storage unit | | | | | | | | | | | Volume ratio Vt/Vh2 | Heat capacity ratio Ht/Hh2 |
|---|---|---|---|---|---|---|---|---|---|---|---|---|---|---|
| | | P1 | P2 | P3 | P4 | P5 | P6 | P7 | P8 | P9 | P10 | P11 | | |
| 1 | 1 (FIG.3) | 2 | 1 | 4 | 3 | — | — | — | — | — | — | — | 1.00 | 0.44 |
| 2 | 1 (FIG.3) | 2 | 1 | 8 | 3 | — | — | — | — | — | — | — | 1.50 | 0.58 |
| 3 | 1 (FIG.3) | 2 | 1 | 9 | 3 | — | — | — | — | — | — | — | 2.00 | 0.72 |
| 4 | 1 (FIG.3) | 2 | 1 | 10 | 3 | — | — | — | — | — | — | — | 2.50 | 0.85 |
| 5 | 1 (FIG.3) | 2 | 1 | 11 | 3 | — | — | — | — | — | — | — | 3.00 | 0.99 |
| 6 | 1 (FIG.3) | 2 | 1 | 12 | 3 | — | — | — | — | — | — | — | 1.00 | 0.38 |
| 7 | 1 (FIG.3) | 2 | 1 | 13 | 3 | — | — | — | — | — | — | — | 1.00 | 0.50 |
| 8 | 1 (FIG.3) | 2 | 1 | 4 | 5 | — | — | — | — | — | — | — | 0.67 | 0.36 |
| 9 | 1 (FIG.3) | 2 | 1 | 4 | 6 | — | — | — | — | — | — | — | 0.50 | 0.30 |
| 10 | 1 (FIG.3) | 2 | 1 | 4 | 7 | — | — | — | — | — | — | — | 0.33 | 0.23 |
| 11 | 1 (FIG.3) | 2 | 1 | 4 | 14 | — | — | — | — | — | — | — | 1.00 | 0.48 |
| 12 | 1 (FIG.3) | 2 | 1 | 4 | 15 | — | — | — | — | — | — | — | 1.00 | 0.52 |
| 13 | 1 (FIG.3) | 2 | 1 | 4 | 7 | — | — | — | — | — | — | — | 0.33 | 0.23 |
| 14 | 1 (FIG.3) | 2 | 1 | 8 | 7 | — | — | — | — | — | — | — | 0.50 | 0.30 |

FIG.10B

| Example NO. | System NO. | Used catalyst NO. Catalyst storage unit | | | | | | | | | | | Volume ratio Vt/Vh2 | Heat capacity ratio Ht/Hh2 |
|---|---|---|---|---|---|---|---|---|---|---|---|---|---|---|
| | | P1 | P2 | P3 | P4 | P5 | P6 | P7 | P8 | P9 | P10 | P11 | | |
| 15 | 1 (FIG.3) | 2 | 1 | 9 | 7 | — | — | — | — | — | — | — | 0.67 | 0.38 |
| 16 | 1 (FIG.3) | 2 | 1 | 10 | 6 | — | — | — | — | — | — | — | 1.25 | 0.59 |
| 17 | 1 (FIG.3) | 2 | 1 | 11 | 5 | — | — | — | — | — | — | — | 2.00 | 0.81 |
| 18 | 1 (FIG.3) | 2 | 1 | 12 | 3 | — | — | — | — | — | — | — | 1.00 | 0.38 |
| 19 | 1 (FIG.3) | 2 | 1 | 4 | 17 | — | — | — | — | — | — | — | 1.00 | 0.62 |
| 20 | 1 (FIG.3) | 2 | 1 | 18 | 3 | — | — | — | — | — | — | — | 6.00 | 1.82 |
| 21 | 1 (FIG.3) | 2 | 1 | 19 | 3 | — | — | — | — | — | — | — | 6.00 | 2.80 |
| 22 | 1 (FIG.3) | 2 | 1 | 20 | 3 | — | — | — | — | — | — | — | 2.00 | 1.04 |
| 23 | 2 (FIG.5) | 2 | 1 | 4 | 3 | — | — | — | — | — | — | — | 1.00 | 0.44 |
| 24 | 3 (FIG.6) | 2 | 1 | 3 | 4 | 3 | — | — | — | — | — | — | 1.00 | 0.44 |
| 25 | 3 (FIG.6) | 2 | 1 | 14 | 4 | 14 | — | — | — | — | — | — | 1.00 | 0.48 |
| 26 | 4 (FIG.7) | 2 | 1 | 3 | 4 | 3 | 3 | 4 | 3 | — | — | — | 1.00 | 0.44 |
| 27 | 5 (FIG.8) | 2 | 1 | 3 | 4 | 3 | 3 | 4 | 3 | 3 | 4 | 3 | 1.00 | 0.44 |
| Comparative example 1 | 1 (FIG.3) | 2 | 1 | 16 | 3 | — | — | — | — | — | — | — | 1.00 | 0.62 |

FIG.10C

| Example NO. | Ratio of the number of meshes Mt/Mh2 | Ratio of GSA Gt/Gh2 | Heat capacity ratio Ht/Hh2 | Heat capacity ratio Ht0/Ht | Results | |
|---|---|---|---|---|---|---|
| | | | | | HC adsorption rate (%) | HC purification rate (%) |
| 1 | 4.50 | 2.29 | 1.16 | 1.00 | 85 | 55 |
| 2 | 4.50 | 2.29 | 1.16 | 0.76 | 84 | 56 |
| 3 | 4.50 | 2.29 | 1.16 | 0.69 | 85 | 57 |
| 4 | 4.50 | 2.29 | 1.16 | 0.51 | 85 | 57 |
| 5 | 4.50 | 2.29 | 1.16 | 0.44 | 84 | 56 |
| 6 | 6.00 | 2.62 | 1.16 | 1.15 | 85 | 56 |
| 7 | 3.00 | 1.82 | 1.16 | 0.87 | 85 | 55 |
| 8 | 4.50 | 2.29 | 0.95 | 1.00 | 87 | 58 |
| 9 | 4.50 | 2.29 | 0.80 | 1.00 | 88 | 59 |
| 10 | 4.50 | 2.29 | 0.62 | 1.00 | 90 | 60 |
| 11 | 3.00 | 1.81 | 1.27 | 1.00 | 86 | 55 |
| 12 | 2.25 | 1.51 | 1.37 | 1.00 | 87 | 55 |
| 13 | 4.50 | 2.29 | 0.62 | 1.00 | 85 | 59 |
| 14 | 4.50 | 2.29 | 0.62 | 0.76 | 84 | 58 |

FIG.10D

| Example NO. | Ratio of the number of meshes Mt/Mh2 | Ratio of GSA Gt/Gh2 | Heat capacity ratio Ht/Hh2 | Heat capacity ratio Ht0/Ht | Results HC adsorption rate (%) | Results HC purification rate (%) |
|---|---|---|---|---|---|---|
| 15 | 4.50 | 2.29 | 0.62 | 0.61 | 85 | 59 |
| 16 | 4.50 | 2.29 | 0.80 | 0.51 | 84 | 59 |
| 17 | 4.50 | 2.29 | 0.95 | 0.44 | 87 | 58 |
| 18 | 6.00 | 2.62 | 1.16 | 1.15 | 85 | 57 |
| 19 | 1.00 | 1.00 | 1.38 | 1.00 | 90 | 33 |
| 20 | 4.50 | 2.29 | 1.16 | 0.24 | 85 | 35 |
| 21 | 1.00 | 1.00 | 1.16 | 0.16 | 85 | 22 |
| 22 | 1.00 | 1.00 | 1.16 | 0.42 | 84 | 30 |
| 23 | 4.50 | 2.29 | 1.16 | 1.00 | 85 | 60 |
| 24 | 4.50 | 2.29 | 1.16 | 1.00 | 88 | 64 |
| 25 | 3.00 | 1.81 | 1.27 | 1.00 | 89 | 67 |
| 26 | 4.50 | 2.29 | 1.16 | 1.00 | 90 | 70 |
| 27 | 4.50 | 2.29 | 1.16 | 1.00 | 93 | 73 |
| Comparative example 1 | 0.50 | 0.69 | 1.16 | 0.71 | 85 | 45 | though many types of HC components are contained in actual exhaust gas, and purification performance of the HC-trap-catalyst is varied depending also on the types of HC. Therefore, just by optimizing the film thickness of the three-way catalyst layer, reduction of the desorption of the adsorbed HC or the delay of the desorption thereof are insufficient, and it is difficult to sufficiently improve purifying characteristics for the cold HC.

EXHAUST GAS PURIFYING SYSTEM

BACKGROUND OF THE INVENTION

1. Field of the Invention

The present invention relates to an exhaust gas purifying system. More particularly, the present invention relates to an exhaust gas purifying system capable of effectively purifying a large amount of hydrocarbons (HC) discharged from a vehicle at a low temperature at time of starting up an engine.

2. Description of the Related Art

In order to purify exhaust gas from an internal combustion engine of an automobile or the like, a three-way catalyst that simultaneously performs oxidation of carbon monoxide (CO) and hydrocarbons (HC) and reduction of nitrogen oxides (NOx) has been widely used. However, at a low temperature at time of starting up the engine, the three-way catalyst is not activated because of the low temperature, and thus a large amount of cold HC discharged in this case cannot be purified.

Recent years, for the purpose of purifying such cold HC, a three-way catalyst added with a HC adsorbing function (hereinafter referred to as a HC-trap-catalyst) has been developed, which includes zeolite as a hydrocarbon adsorbent (HC adsorbent) and a purifying catalyst such as a three-way catalyst.

The HC-trap-catalyst contains the HC adsorbent and a material of the three-way catalyst. The HC-trap-catalyst temporarily adsorbs and holds cold HC discharged in a low temperature range at the time of starting up the engine, in which the three-way catalyst is not activated. Then, the HC-trap-catalyst gradually desorbs and even purifies the HC when the three-way catalyst is activated due to a temperature increase of the exhaust gas.

As the catalyst purifying the HC desorbed from the HC adsorbent, a catalyst obtained by mixing noble metal species such as rhodium (Rh), platinum (Pt) and palladium (Pd) in the same layer and a catalyst of a multilayer structure including Rh and Pd layers have been proposed. Japanese Patent Laid-Open Publication H2-56247 (published in 1990) discloses an exhaust gas purifying catalyst that includes a first layer mainly containing zeolite as a HC adsorbent and a second layer provided on the first layer. The second layer mainly contains noble metals such as Pt, Pd and Rh.

Exhaust gas purifying systems, each using the HC-trap-catalysts as described above, have been disclosed in Japanese Patent Laid-Open Publications H6-74019 (published in 1994), H7-144119 (published in 1995), H6-142457 (published in 1994), H5-59942 (published in 1993), H7-102957 (published in 1995), H7-96183 (published in 1995) and H11-81999 (published in 1999).

SUMMARY OF THE INVENTION

In the case of using the HC-trap-catalyst, the cold HC adsorbed to the HC adsorbent at the time of starting up the engine is often desorbed before an exhaust gas temperature reaches an activation temperature of the three-way-catalyst. While the three-way catalyst in the HC-trap-catalyst is not sufficiently activated, the desorbed HC are discharged in an unpurified state. Accordingly, in order to increase purification efficiency of the cold HC, it is desired to delay desorption of the HC.

In the HC-trap-catalyst having the structure in which the adsorbent layer and the three-way catalyst layer are laminated, in order to efficiently purify the desorbed HC in the three-way catalyst layer without inhibiting an adsorbing function of the adsorbent, studies have been conducted on a film thickness of the three-way catalyst layer. However, many types of HC components are contained in actual exhaust gas, and purification performance of the HC-trap-catalyst is varied depending also on the types of HC. Therefore, just by optimizing the film thickness of the three-way catalyst layer, reduction of the desorption of the adsorbed HC or the delay of the desorption thereof are insufficient, and it is difficult to sufficiently improve purifying characteristics for the cold HC.

Moreover, in order to improve the purifying efficiency for the cold HC, the following methods have been studied. In one method, the three-way catalyst is sufficiently activated by switching exhaust passages, and then the adsorbed HC are desorbed to be purified by the three-way catalyst. In another method, the three-way catalyst is activated early by an electric heater. In the other method, air is introduced from the outside to advance a start of activating the three-way catalyst. However, these methods are costly because of complex system constitutions, and in addition, cannot sufficiently raise the purification efficiency of the cold HC.

Furthermore, a method has been studied, in which a heat capacity of an exhaust pipe or the like upstream of the HC-trap-catalyst is increased, and thus a temperature increase of the HC-trap-catalyst is delayed, and a desorption rate of the adsorbed HC from the HC-trap-catalyst is reduced. However, the desorption rate of the adsorbed HC is greatly affected not only by the temperature but also an amount and a flow rate of the exhaust gas diffused in the HC-trap-catalyst, and therefore, a sufficient effect of reducing the desorption is not obtained. In addition, since the delay of the temperature increase delays the start of activating the three-way catalyst, the desorbed HC cannot be sufficiently purified.

An object of the present invention is to provide an exhaust gas purifying system that has a relatively simple constitution, can purify the cold HC efficiently, and is excellent in the purification performance for HC, CO and NOx from a cold range to a hot range.

In order to achieve the object, an exhaust gas purifying system according to an aspect of the present invention is a system for purifying gas exhausted from an engine, including a gas passage for gas exhausted from the engine, a first three-way catalyst arranged on the exhaust gas passage, a first HC-trap-catalyst arranged downstream of the first three-way catalyst on the gas passage, a second HC-trap-catalyst arranged downstream of the first HC-trap-catalyst on the gas passage, and a heat capacitor arranged between the first HC-trap-catalyst and the second HC-trap-catalyst on the gas passage. Here, each of the heat capacitor and the second HC-trap-catalyst has a honeycomb carrier, and a ratio $Gt/Gh_2$ of a geometric surface area Gt of the honeycomb carrier of the heat capacitor to a geometric surface area $Gh_2$ of the honeycomb carrier of the second HC-trap-catalyst is in a range of 1 to 5. Note that a geometric surface area G of the honeycomb carrier is a value obtained by dividing an inner surface area of the honeycomb carrier by a capacity of the honeycomb carrier.

BRIEF DESCRIPTION OF THE DRAWINGS

FIG. 9 is a table showing characteristics of catalysts 1 to 20 used in examples.

FIG. 10A to FIG. 10D are tables showing conditions of exhaust gas purifying catalysts of the examples.

DETAILED DESCRIPTION OF THE EMBODIMENTS

First Embodiment

Hereinafter, description will be made for an exhaust gas purifying system according to a first embodiment of the present invention.

Figure 1:
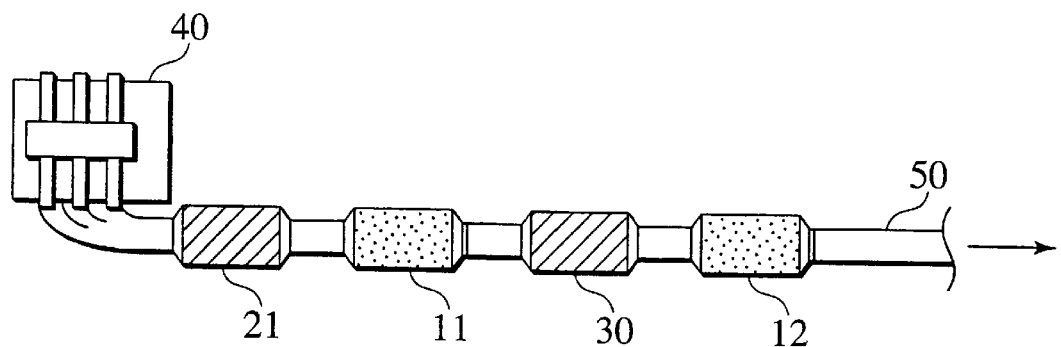
FIG. 1 is a constitutional view showing a concept of an exhaust gas purifying system according to a first embodiment of the present invention.

As shown in FIG. 1, the exhaust gas purifying system of the first embodiment at least includes a first HC-trap-catalyst 11 arranged upstream and a second HC-trap-catalyst 12 arranged downstream on an exhaust gas passage 50 for exhaust gas exhausted from an engine 40. The system further includes a first three-way-catalyst 21 upstream of the first HC-trap-catalyst 11, and a heat capacitor 30 between the first HC-trap-catalyst 11 and the second HC-trap-catalyst 12. The heat capacitor 30 reduces a temperature increasing of the second HC-trap-catalyst 12 to delay desorption of HC adsorbed thereon. Moreover, each of the beat capacitor 30 and the second HC-trap-catalyst includes a honeycomb carrier, characterized in that a ratio $Gt/Gh_2$ of a geometric surface area Gt of the honeycomb carrier of the heat capacitor 30 to a geometric surface area $Gh_2$ of the honeycomb carrier of the second HC-trap-catalyst is in a range of 1 to 5.

Here, the geometric surface area of the honeycomb carrier is a value obtained by dividing an inner surface area of the honeycomb carrier by a capacity of the honeycomb carrier. The geometric surface area is used as an index of indicating a degree of a substantial contact frequency of exhaust gas passing through each cell in the honeycomb carrier and a catalyst formed on an inner surface of the honeycomb carrier. Specifically, the higher a value of the geometric surface area is, the higher the contact frequency of the exhaust gas and the catalyst is. On the other hand, the lower the value of the geometric surface area is, the lower the contact frequency of the exhaust gas and the catalyst is.

Figure 2A:
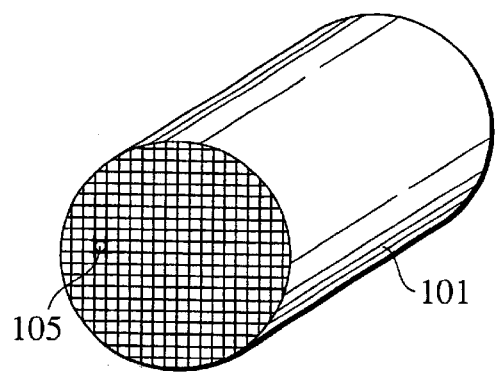
FIG. 2A is a perspective view showing an exterior appearance of a HC-trap-catalyst according to the first embodiment of the present invention.
Figure 2B:
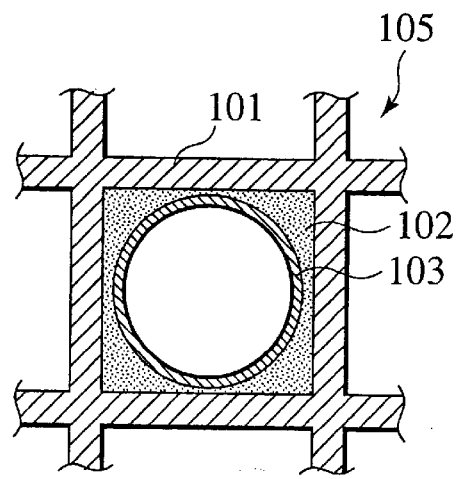
FIG. 2B is a view showing a partially enlarged view of each cell of the HC-trap-catalyst.

As shown in FIG. 2A, each HC-trap-catalyst for use in the exhaust gas purifying system of the first embodiment includes a monolithic carrier, that is, a honeycomb carrier 101, which has a plurality of cells 105 forming a honeycomb shape on a cross section thereof. Moreover, FIG. 2B is a partially enlarged cross-sectional view showing a constitution of each cell 105 serving as a passage of the exhaust gas. On the honeycomb carrier 101, for example, a HC adsorbent layer 102 and a purifying catalyst layer (three-way catalyst layer) 103 are formed. Note that the structure of the HC-trap-catalyst is not limited to the structure shown in FIG. 2B.

Each of the three-way catalyst and the heat capacitor 30, which are for use in the exhaust gas purifying system of the first embodiment, has a honeycomb carrier similar to that of the HC-trap-catalyst though the numbers of meshes (the number of cells) thereof are different from that of the HC-trap-catalyst.

First, in the exhaust gas purifying system according to the first embodiment, since the heat capacitor 30 is arranged between the first HC-trap-catalyst located upstream and the second HC-trap-catalyst 12 located downstream, operations as will be described later are obtained. The cold HC contained in the exhaust gas at the low temperature at the time of starting up the engine and immediately after the start-up thereof are first adsorbed to the adsorbent of the first HC-trap-catalyst 11. As the temperature of the exhaust gas gradually increases, the temperature of the adsorbent of the first HC-trap-catalyst 11 increases. When the temperature of the first HC-trap-catalyst 11 reaches the desorption starting temperature, the adsorbed HC are desorbed from the first HC-trap catalyst 11 and adsorbed to the adsorbent of the second HC-trap-catalyst 12 located downstream. However, since the heat of the exhaust gas is absorbed to the heat capacitor 30 arranged between the HC-trap-catalysts, the temperature increase of the adsorbent of the second HC-trap-catalyst 12 is delayed. Accordingly, the time from when the adsorbent layer of the second HC-trap-catalyst reaches the desorption starting temperature to when the HC are desorbed from the adsorbent layer becomes sufficiently long. Even if the temperature of the first HC-trap-catalyst 11 is increased for this while, since the desorbed HC are efficiently adsorbed again to the second HC-trap-catalyst 12 located downstream, the amount of the HC discharged in the unpurified state is reduced.

Moreover, in the exhaust gas purifying system of the first embodiment, the ratio $Gt/Gh_2$ of the geometric surface area Gt of the heat capacitor 30 to the geometric surface area $Gh_2$ of the second HC-trap-catalyst 12 is set at the range of 1 to 5, and therefore, the contact frequency of the second HC-trap-catalyst 12 and the exhaust gas is relatively low. Since the HC desorption rate of the HC-trap-catalyst tends to be faster as the contact frequency of the exhaust gas and the catalyst is higher, the HC desorption rate of the second HC-trap-catalyst 12 can be lowered.

As described above, in the exhaust gas purifying system according to the first embodiment, the heat capacitor 30 is arranged upstream of the second HC-trap-catalyst 12, and the geometric surface area of the second HC-trap-catalyst 12 is relatively lowered, and thus the start of the HC desorption can be delayed, and the HC desorption rate can be lowered. Since the HC desorption rate is reduced in terms of both the temperature and the contact frequency of the gas and the catalyst, the HC desorption rate can be reduced without lowering the temperature of the purifying catalyst layer (three-way catalyst layer) in the NC-trap-catalyst too much. Therefore, the purification efficiency of the desorbed HC can be maintained. Accordingly, it is possible to enhance the cold HC purification efficiency. Note that the above-described feature cannot be obtained unless $Gt/Gh_2$ is 1 or more. On the other hand, when $Gt/Gh_2$ exceeds 5, it becomes difficult to adjust the value of $Gt/Gh_2$, and the contact frequency of the exhaust gas and the catalyst in the second HC-trap-catalyst is lowered too much, thus causing reduction of the total HC purification efficiency.

Note that it is possible to adjust values of the geometric surface areas of the heat capacitor 30 and the second HC-trap-catalyst 12 by the capacity of each honeycomb carrier and the number of meshes thereof, that is, each mesh density on the cross section of the gas passage, or the like.

In the exhaust gas purifying system of the first embodiment, the heat capacitor 30 is arranged between the first HC-trap-catalyst 11 and the second HC-trap-catalyst 12. It is preferable that the heat capacitor 30 control the time when the temperature of the exhaust gas, which frowns into the second HC-trap-catalyst 12 located downstream, reaches 150° C. so as to be delayed by 10 seconds to 90 seconds as compared with the case of not arranging the heat capacitor. Note that the 150° C. is the temperature in which the adsorbed HC starts to desorb. Otherwise, it is preferable that the heat capacitor 30 control the time when the amount of the HC desorbed from the HC-trap-catalyst 12 located downstream reaches at a peak (the HC desorption rate is the highest) so as to be delayed by 10 seconds to 90 seconds as compared with the case of not arranging the heat capacitor. A cycle of adsorption, hold, desorption, and purification in the first HC-trap-catalyst 11 located upstream and a cycle of adsorption, hold, desorption, and purification in the second HC-trap-catalyst 12 located downstream can be continuously executed. Thus, the cold HC is purified more efficiently.

Moreover, in the exhaust gas purifying system of this embodiment, by use of the tree-way catalyst as the heat capacitor 30, the heat brought by the exhaust gas can be efficiently used. As compared with use of a pipe having a thick wall or radiator fins as the heat capacitor 30, the three-way catalyst is excellent in the temperature adjusting effect. Ceramic or a metal monolith carrier can be used as the heat capacitor 30, however, they have no functions of purifying the exhaust gas. When the three-way catalyst is used as the heat capacitor 30, it functions as a purifying catalyst after the catalyst reaches the activation temperature by the heat of the exhaust gas. Therefore, the HC, CO and NOx discharged while the temperature is being transferred from the cold range to the hot range or the HC, CO and NOx in the hot range can be purified efficiently. In addition, if the geometric surface area ratio $Gt/Gh_2$ is in the range of 1 to 5, with regard to the second three-way catalyst (heat capacitor 30), since the contact frequency with the exhaust gas is relatively high, high catalytic efficiency can be obtained.

This three-way catalyst (heat capacitor 30) can be singly accommodated in a converter vessel arranged upstream of the second HC purifying catalyst 12 or can be accommodated together with the second HC purifying catalyst 12 in the same converter vessel.

Moreover, the first three-way catalyst 21 and the second three-way catalyst (heat capacitor 30) are arranged upstream of the first HC-trap-catalyst 11 and the second HC-trap-catalyst 12, respectively, that is, closer to the engine. Therefore, since the exhaust gas temperatures therein are higher, the three-way catalysts can be raised to the activation temperature earlier. As described above, the first three-way catalyst 21, the first HC-trap-catalyst 11, the second three-way catalyst (heat capacitor 30) and the second HC-trap-catalyst 12 are arranged in this order from the upstream side, and thus the three-way catalysts can reach the activation temperature earlier, and the HC-trap-catalysts can reduce the temperature increase to delay the HC desorption rate. Therefore, the HC purification efficiency of the system can be enhanced as a whole.

In the exhaust gas purifying system in the first embodiment, preferably, the number of meshes Mt of the honeycomb carrier of the second three-way catalyst as the heat capacitor 30 is set in a range of 93 to 232.5 cells/cm² (600 to 1500 cpsi), and the number of meshes $Mh_2$ of the honeycomb carrier of the second HC-trap-catalyst 12 is set in a range of 15.5 to 93 cells/cm² (100 to 600 cpsi). Note that the "cpsi" here implies "cells per square inches."

Since the number of meshes Mt of the second three-way catalyst (heat capacitor 30) is large, the contact frequency of the exhaust gas and the second three-way catalyst is high, thus improving the purification efficiency. Also due to the large Mt, the second three-way catalyst has a high heat capacity, thus reducing the temperature increase of the second HC-trap-catalyst 12 and delaying the desorption rate of the HC. Since the number of meshes $Mh_2$ of the second HC-trap-catalyst 12 is small, the contact frequency of the exhaust gas and the catalyst is low and the diffusion amount of the gas into the HC adsorbent layer is restricted, thus reducing the HC desorption rate. Preferably, the ratio of the numbers of meshes $Mt/Mh_2$ is set in a range of 2 to 10.

Moreover, a ratio $Vt/Vh_2$ of a volume Vt of the second three-way catalyst (heat capacitor 30) to a volume $Vh_2$ of the second HC-trap-catalyst 12 is preferably set in a range of 0.25 to 3.0. Thus, the delay of the desorption start of the adsorbed HC in the HC-trap-catalyst located downstream and the activation of the purifying catalyst can be made to coincide in timing with each other, and therefore, the cold HC can be purified more surely.

Furthermore, a ratio $Ht/Hh_2$ of a heat capacity Ht of the second three-way catalyst (heat capacitor 30) to a heat capacity $Hh_2$ of the second HC-trap-catalyst is preferably set in a range of 0.1 to 3.5. Thus, the desorption starting temperature of the adsorbed HC and the activation starting temperature of the purifying catalyst can be made to coincide with each other in the second HC-trap-catalyst 12, and therefore, more efficient purification of the cold HC can be performed.

Figure 3:
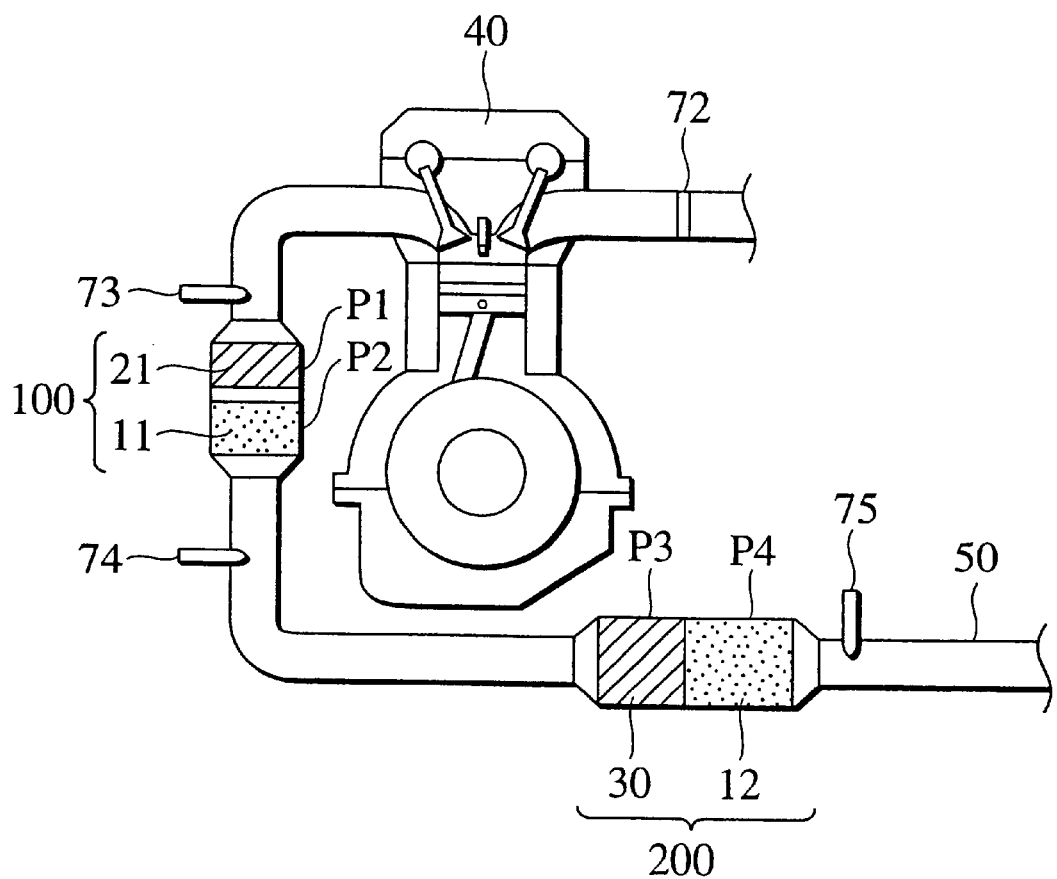
FIG. 3 is a constitutional view of an exhaust gas purifying system (No. 1) according to the first embodiment of the present invention.
Figure 4:
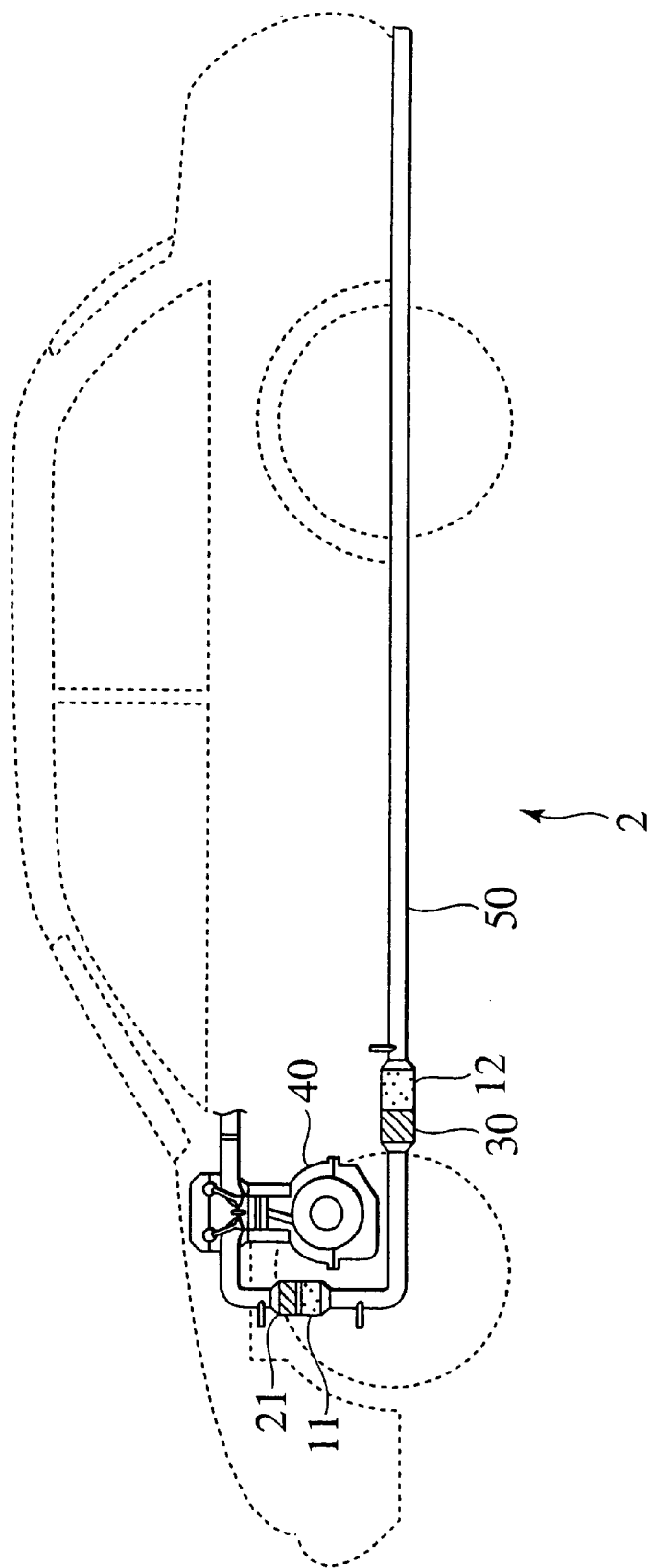
FIG. 4 is a view showing a state of the exhaust gas purifying system according to the first embodiment, the system being mounted on a vehicle.

FIG. 3 is a view showing a more concrete aspect of the exhaust gas purifying system according to the first embodiment. FIG. 4 is a view showing a position of the exhaust gas purifying system in a vehicle body when the exhaust gas purifying system shown in FIG. 3 is mounted on a vehicle. A space in the vehicle body is extremely limited, and particularly in an engine room, there is hardly any room for accommodating the system therein. Therefore, only the first three-way catalyst 21 and the first HC-trap-catalyst 11 are accommodated in the engine room, and the second three-way catalyst (heat capacitor 30) and the second HC-trap-catalyst 12 are arranged on the exhaust gas passage 50 under the vehicle body. When other plural catalysts are added, these additional catalysts are arranged under the vehicle body.

Note that each catalyst is generally accommodated in the converter vessel connected onto the exhaust gas passage. One or plural catalysts can be accommodated in the converter vessel. For example, in the exhaust gas purifying system according to the first embodiment, which is shown in FIG. 3, the first three-way catalyst 21 and the first HC-trap-catalyst 11 are accommodated in a converter vessel 100, and the second three-way catalyst (heat capacitor 30) and the second HC-trap-catalyst 12 are accommodated in a converter vessel 200.

Next, description will be made for components and the like of the above-described HC-trap-catalyst. In the case of using zeolite as the HC adsorbent of the HC-trap-catalyst, the adsorption performance for the cold HC is affected by a correlation between the composition of the HC species in the exhaust gas and the pore size of the zeolite. Therefore, it is necessary to select and use zeolite having optimal pore size and distribution of pore size and an optimal skeleton structure. Although an MFI type zeolite is generally used, zeolite having another pore size (for example, USY) is singly used, or plural types of such zeolites are mixed, and thus a distribution of pore size is adjusted.

As the HC adsorbent, H-type β-zeolite having a Si/2Al ratio of 10 to 1000 can be used. Since this H-type β-zeolite has a wide distribution of pore size and is excellent in heat resistance, the H-type β-zeolite is suitable from a point of view of improving the adsorption efficiency of the HC and enhancing the heat resistance.

Moreover, as the HC adsorbent, if the one selected from the MFI-type, a Y-type, USY, mordenite or ferrierite or an arbitrary compound thereof is used together with the H-type β-zeolite, then the distribution of pore size of the zeolites can be enlarged, and thus the adsorption efficiency of the HC can be further improved.

To the HC adsorbent layer 102, not only the zeolite series material as described above, but also the one selected from palladium (Pd), magnesium (Mg), calcium (Ca), strontium (Sr), barium (Ba), silver (Ag), yttrium (Y), lanthanum (La), cerium (Ce), neodymium (Nd), phosphorous (P), boron (B) and zirconium (Zr) or a compound thereof can be added. Thus, since the adsorption performance and heat resistance of the zeolite can be enhanced, the desorption of the adsorbed HC can be delayed.

Furthermore, the HC absorbent layer 102 may contains the zeolite as described above as a main component. One selected from Pt, Rh and PD or a compound thereof, zirconium oxide containing the one selected from Ce, Nd praseodymium (Pr) and La or a compound thereof in a range of 1 to 40 mol % in terms of metal, and alumina, may be doped to the zeolite in the HC adsorbent layer 102. Since the purifying catalyst component is added to the HC adsorbent, the desorption and purification efficiency of the HC-trap-catalyst can be enhanced.

Moreover, as a material of the honeycomb carrier, conventionally known one can be used without receiving any particular limitations. Concretely, the honeycomb carrier made of any of cordierite, metal and silicon carbide can be used.

As the three-way catalyst, platinum, palladium and rhodium, which exert the three-way purification function, refractory inorganic oxide such as alumina, and the like can be used. Moreover, also for the carrier of the three-way catalyst, various monolithic carriers can be used similarly to the HC-trap-catalyst.

Second Embodiment

Figure 5:
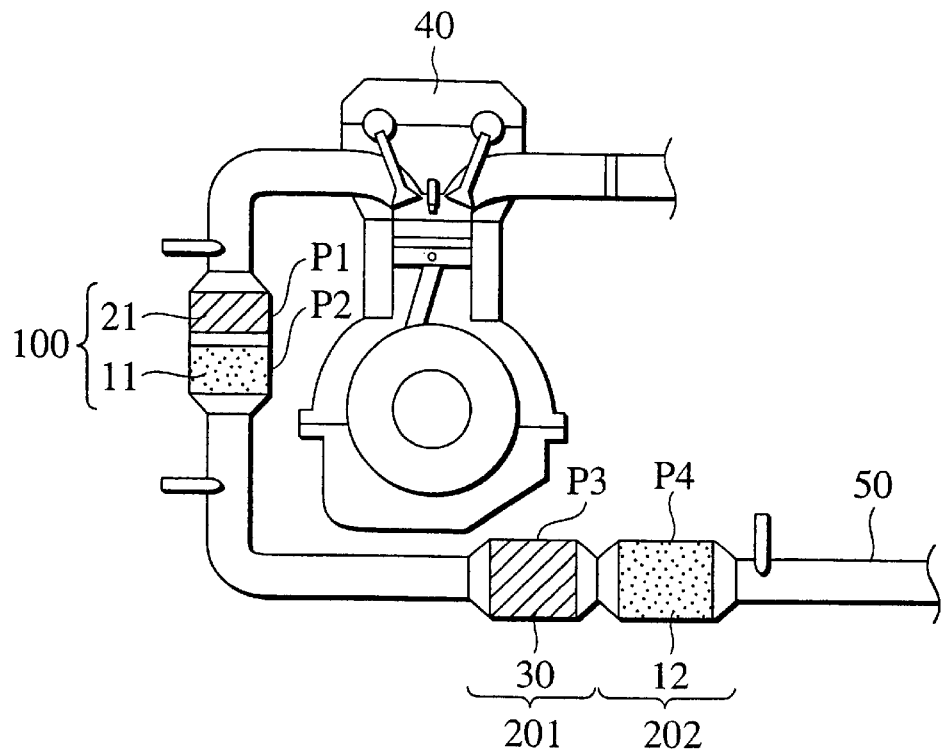
FIG. 5 and FIG. 6 are constitutional views of exhaust gas purifying systems (No. 2, No. 3) according to second and third embodiments, respectively.

FIG. 5 is a view showing a constitution of an exhaust gas purifying system according to a second embodiment. The feature of this system is that the second three-way catalyst (heat capacitor 30) and the second HC-trap-catalyst 12 are accommodated in independent converter vessels 201 and 202, respectively. Other elements in the constitution are common to those of the exhaust gas purifying system according to the first embodiment. Specifically, the second three-way catalyst as the heat capacitor 30 is accommodated in the converter vessel independently, thus making it possible to further increase the substantial heat capacity. The effect of reducing the temperature increase of the second HC-trap-catalyst 12 is enhanced, thus making it possible to delay the desorption rate of the HC from the HC-trap-catalyst 12 more effectively.

Note that other conditions are similar to those of the first embodiment.

Third Embodiment

Figure 6:
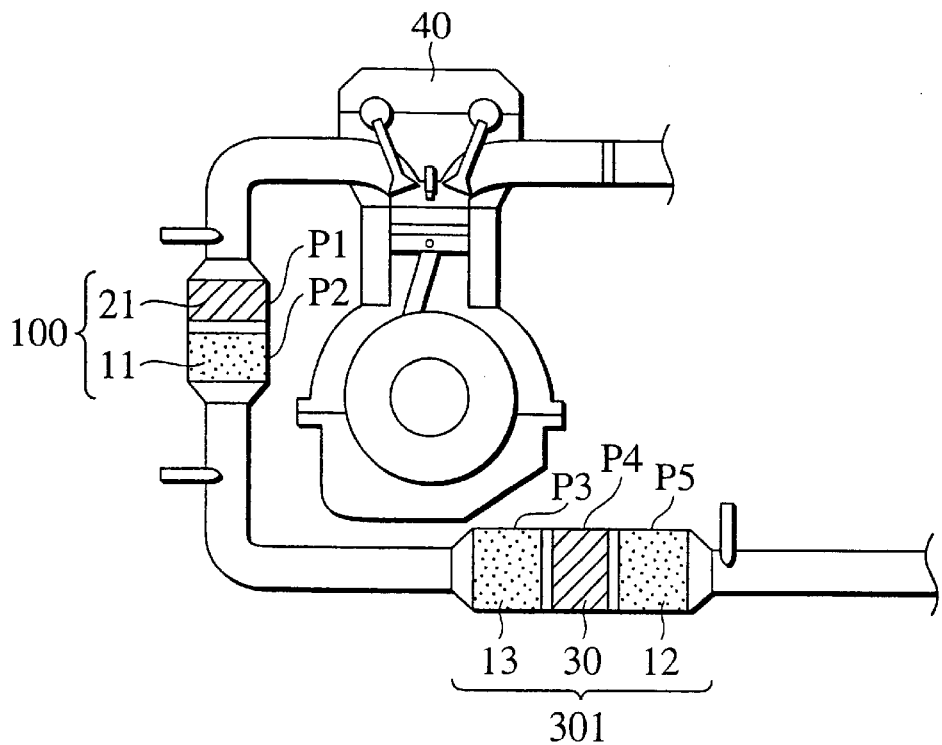

FIG. 6 is a view showing a constitution of an exhaust gas purifying system according to a third embodiment. The feature of this system is that a third HC-trap-catalyst 13, the second three-way catalyst 30 and the second HC-trap-catalyst 12 are accommodated in a single converter vessel 301. Other conditions are similar to those of the fist embodiment.

The HC-trap-catalysts and the three-way catalyst are alternately arranged in the single converter vessel 301. Therefore, in the HC-trap-catalyst 12 arranged downstream of the second three-way catalyst (heat capacitor 30) so as to be adjacent thereto, the HC desorption rate can be delayed by the function of the three-way catalyst as the heat capacitor, and the unpurified HC desorbed from the third HC-trap-catalyst 13 is purified in the second three-way catalyst (heat capacitor 30) located downstream thereof to be adjacent thereto. Thus, the cold HC purification efficiency of the system can be enhanced as a whole.

As described above, when the plural catalysts are accommodated in the single converter vessel, preferably, the HC-trap-catalysts and the three-way catalyst are alternately arranged. Moreover, rather than a single arrangement of one HC-trap-catalyst, more preferably, the HC-trap-catalyst is divided into two HC-trap-catalysts, each having a half capacity, and these two HC-trap-catalysts are arranged so as to sandwich the three-way catalyst therebetween. Thus, timing of the cycle of HC adsorption, hold, desorption and purification in each HC-trap-catalyst is shifted from that of another by the purification function of the three-way catalyst and the function as the heat capacitor, thus making it possible to enhance the overall HC purification efficiency.

Moreover, with regard to the honeycomb carrier of the three-way catalyst (heat capacitor 30) and the honeycomb carriers of the HC-trap-catalysts 12 and 13, which are accommodated in the single converter, preferably, the number of meshes Mt of the honeycomb carrier of the three-way catalyst (heat capacitor 30) is set in a range of 93 to 232.5 cells/cm$^2$ (600 to 1500 cpsi), and each number of meshes $Mh_2$ and $Mh_3$ of the honeycomb carriers of the HC-trap-catalysts 12 and 13 is set in a range of 15.5 to 93 cells/cm$^2$ (100 to 600 cpsi).

Figure 7:
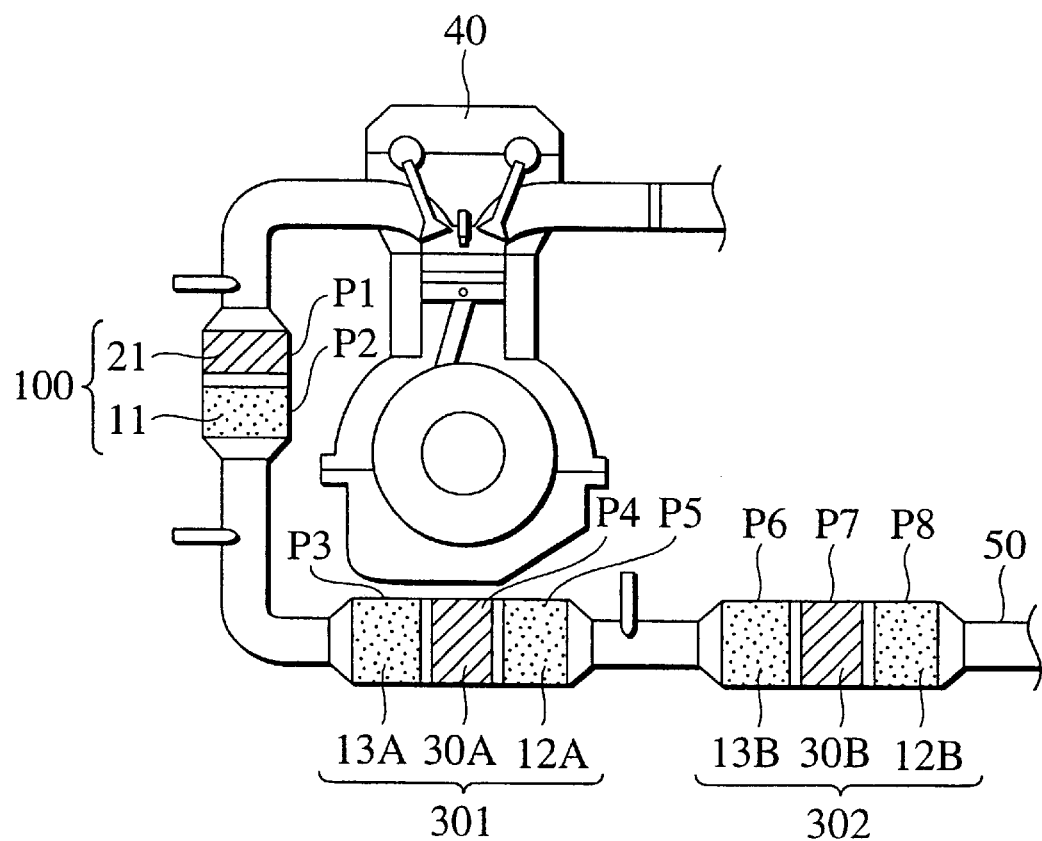
FIG. 7 and FIG. 8 are constitutional views of exhaust gas purifying systems (No. 4, No. 5) according to other embodiments.
Figure 8:
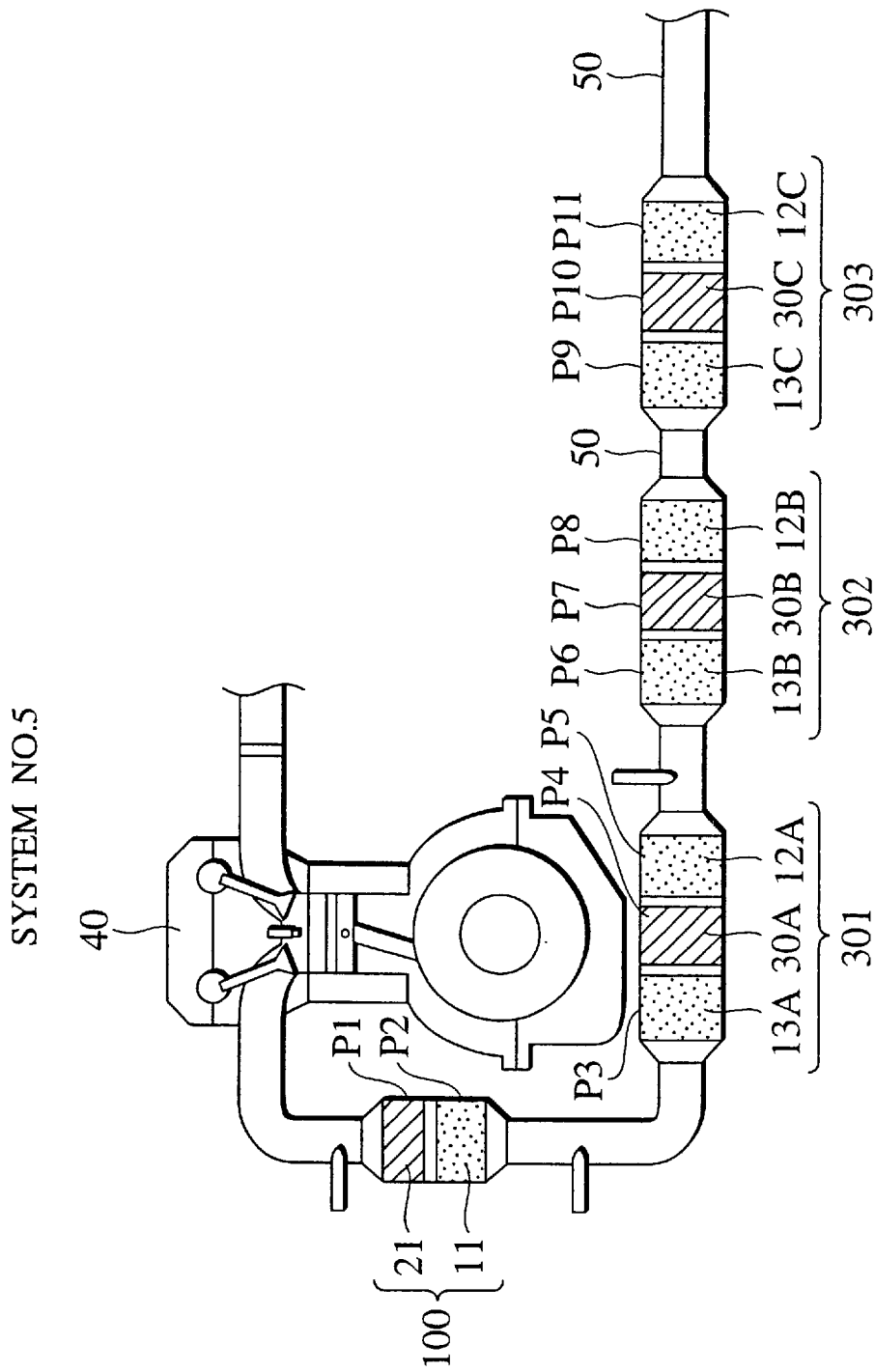

Exhaust gas purifying systems shown in FIG. 7 and FIG. 8 are modification examples of the exhaust gas purifying system according to the third embodiment. As shown in FIG. 7 and FIG. 8, similarly to the converter vessel 301, converter vessels, each having the HC-trap-catalysts and the three-way catalyst arranged alternately, may be further arranged in plural.

EXAMPLES

Hereinafter, description will be made for concrete examples of the present invention.

Preparation of Catalyst

Catalysts 1 to 20 were prepared under the following conditions. The conditions of each catalyst are shown in Table 1.

Catalyst 1: HC-trap-catalyst 800 g of β-zeolite powder having a Si/2Al ratio of 40, 1333.3 g of silica sol (solid content concentration of 15 mass %) and 1000 g of pure water were poured into a ball mill pot made of alumina, then were milled for 60 minutes, and thus a slurry solution was obtained. 300 cells/6 mil (that is, 46.5 cells/cm$^2$, and cell wall thickness 0.015 cm) of this slurry solution was coated on a monolithic carrier, and excessive slurry in the cell was removed by an airflow. Then, the slurry coated carrier was dried in a flow of air at 50° C. for 30 minutes, dried in a flow of air at 150° C. for 15 minutes, and then baked at 400° C. for 1 hour. With regard to a coating amount in this case, coating step was repeated until the coating amount reached 350 g/L after the baking, and thus a catalyst-a was obtained.

Alumina powder (Al: 97 mol %) containing 3 mol % of Ce was impregnated with a palladium nitrate solution, or sprayed therewith while being stirred at a high speed. After the alumina powder was dried at 150° C. for 24 hours, the dried alumina powder was baked at 400° C. for 1 hour, and then at 600° C. for 1 hour, and thus Pd supported alumina powder (powder-a) was obtained. Pd concentration of this powder-a was 4.0 mass %.

Cerium oxide power (Ce: 67 mol %) containing 1 mol % of La and 32 mol % of Zr was impregnated with the palladium nitrate solution, or sprayed therewith while being stirred at a high speed. After the cerium oxide powder was dried at 150° C. for 24 hours, the dried cerium oxide powder was baked at 400° C. for 1 hour, and then at 600° C. for 1 hour, and thus Pd supported cerium oxide powder (powder-b) was obtained. Pd concentration of this powder-b was 2.0 mass %.

400 g of the Pd supported alumina powder (powder-a), 141 g of the Pd supported cerium oxide powder (powder-b), 240 g of nitric acid alumina sol (24 g, in terms of $Al_2O_3$, of sol obtained by adding 10 mass % of nitric acid to 10 mass % of boehmite alumina) and 100 g of barium carbonate (67 g of BaO) were poured together with 2000 g of pure water into a magnetic ball mill, then were mixed and milled, and thus a slurry solution was obtained. This slurry solution was coated on the catalyst-a, dried after removing excessive slurry in the cells by an airflow, and baked at 400° C. for 1 hour. This slurry solution was coated so as to have a coated layer weight of 66.5 g/L, and thus a catalyst-b was obtained.

Alumina powder (Al: 97 mol %) containing 3 mol % of Zr was impregnated with a rhodium nitrate aqueous solution, or sprayed therewith while being stirred at a high speed. After being dried at 150° C. for 24 hours, the alumina powder was baked at 400° C. for 1 hour, and then at 600° C. for 1 hour, and thus Rh supported alumina powder (powder-c) was obtained. Rh concentration of this powder-c was 2.0 mass %.

Alumina powder (Al: 97 mol %) containing 3 mol % of Ce was impregnated with a dinitro diamine platinum aqueous solution, or sprayed therewith while being stirred at a high speed. After being dried at 150° C. for 24 hours, the alumina powder was baked at 400° C. for 1 hour, and then at 600° C. for 1 hour, and thus Pt supported alumina powder (powder-d) was obtained. Pt concentration of this powder-d was 3.0 mass %.

Zirconium oxide powder containing 1 mol % of La and 20 mol % of Ce was impregnated with the dinitro diamine platinum aqueous solution, or sprayed therewith while being stirred at a high speed. After being dried at 150° C. for 24 hours, the zirconium oxide powder was baked at 400° C. for 1 hour, and then at 600° C. for 1 hour, and thus Pt supported alumina powder (powder-e) was obtained. Pt concentration of this powder-e was 3.0 mass %.

Then, 118 g of the Rh supported alumina powder (powder-c), 118 g of the Pt supported alumina powder (powder-d), 118 g of the Pt supported zirconium oxide powder (powder-e) and 160 g of nitric acid alumina sol were poured into a magnetic ball mill, then were mixed and milled, and thus a slurry solution was obtained. This slurry solution was coated on the catalyst-b, dried after removing excessive slurry in the cells by an airflow, and baked at 400° C. for 1 hour. This slurry solution was coated so as to have a coated layer weight of 37 g/L, and thus a catalyst 1 was obtained. Noble metal supported amounts of this catalyst 1 were 0.71 g/L for Pt, 1.88 g/L for Pd, and 0.24 g/L for Rh.

Catalyst 2: Three-way catalyst 530 g of the powder-a, 118 g of the powder-b, 120 g of nitric acid alumina sol (12 g, in terms of $A_2O_3$, of sol obtained by adding 10 mass % of nitric acid to 10 mass % of boehmite alumina) and 40 g of barium carbonate (27 g of BaO) were poured together with 1000 g of pure water into a magnetic ball mill, then were mixed and milled, and thus a slurry solution was obtained. This slurry solution was coated on a monolithic carrier of 900 cell/2 mil (that is, 139.5 cells/cm$^2$, and cell wall thickness of 0.0051 cm), which has a catalyst capacity of 0.5 L ($0.5 \times 10^{-3}$ m$^3$), dried after removing excessive slurry in the cells by an airflow, and baked at 400° C. for 1 hour. This slurry solution was coated so as to have a coated layer weight of 70 g/L, and thus a catalyst-c was obtained.

235 g of the powder-e, 100 g of zirconium oxide powder containing 1 mol % of La and 20 mol % of Ce and 150 g of nitric acid alumina sol (15 g, in terms of $Al_2O_3$, of sol obtained by adding 10 mass % of nitric acid to 10 mass % of boehmite alumina) were poured together with 1000 g of pure water into a magnetic ball mill, then were mixed and milled, and thus a slurry solution was obtained. This slurry solution was coated on the catalyst-c, dried after removing excessive slurry in the cells by an airflow, and baked at 400° C. for 1 hour. This slurry solution was applied so as to have a coated layer weight of 35 g/L, and thus a catalyst 2 (three-way catalyst) was obtained. Noble metal supported amounts of the catalyst were 2.35 g/L for Pd and 0.47 g/L for Rh.

Catalyst 3: HC-trap-catalyst

The slurry solution obtained by mixing and milling zeolite and silica sol as described above was coated on a monolithic carrier of 200 cell/10 mil (that is, 31 cells/cm$^2$, and cell wall thickness of 0.0254 cm), which has a catalyst capacity of 0.5 L ($0.5 \times 10^{-3}$ m$^3$). Then, the carrier was dried in an airflow at 50° C. for 30 minutes after removing excessive slurry in the cells by an airflow, and baked at 400° C. for 1 hour after being dried in an airflow at 150° C. for 15 minutes. With regard to a coating amount in this case, coating step was repeated until the coating amount reached 300 g/L after the baking, and thus a catalyst-d was obtained.

Then, similarly to the catalyst 1, the purifying catalyst component layer was formed on this catalyst-d, and thus a catalyst 3 was obtained. Noble metal supported amounts of the catalyst were 0.71 g/L for Pt, 1.88 g/L for Pd, and 0.24 g/L for Rh.

Catalyst 4: Three-way catalyst

Alumina powder (Al: 97 mol %) containing 3 mol % of Zr was impregnated with a rhodium nitrate aqueous solution, or sprayed therewith while being stirred at a high speed. After being dried at 150° C. for 24 hours, the alumina powder was baked at 400° C. for 1 hour, and then at 600° C. for 1 hour, and thus Rh supported alumina powder (powder-f) was obtained. Rh concentration of this powder-f was 1.0 mass %.

Alumina powder (Al: 97 mol %) containing 3 mol % of Ce was impregnated with a dinitro diamine platinum aqueous solution, or sprayed therewith while being stirred at a high speed. After being dried at 150° C. for 24 hours, the alumina powder was baked at 400° C. for 1 hour, and then at 600° C. for 1 hour, and thus Pt supported alumina powder (powder g) was obtained. Pt concentration of this powder g was 1.5 mass %.

Zirconium oxide powder containing 1 mol % of La and 20 mol % of Ce was impregnated with the dinitro diamine platinum aqueous solution, or sprayed therewith while being stirred at a high speed. After being dried at 150° C. for 24 hours, the zirconium oxide powder was baked at 400° C. for 1 hour, and then at 600° C. for 1 hour, and thus Pt supported alumina powder (powder-h) was obtained. Pt concentration of this powder h was 1.5 mass %.

Then, 157 g of the Rh supported alumina powder (powder-f), 393 g of the Pt supported alumina powder (powder-g), 392 g of the Pt supported zirconium oxide powder (powder-h) and 180 g of nitric acid alumina sol were poured into a magnetic ball mill, then were mixed and milled, and thus a slurry solution was obtained. This slurry solution was coated on a monolithic carrier of 900 cell/2 mil (that is, 139.5 cells/cm$^2$, and cell wall thickness of 0.051 cm), which has a catalyst capacity of 0.5 L to 3.0 L (0.5×10$^{-3}$ m$^3$ to 3.0×10$^{-3}$ m$^3$). Then, the carrier was dried after removing excessive slurry in the cells by an airflow, and baked at 400° C. for 1 hour. This slurry solution was coated so as to have a coated layer weight of 96 g/L, and thus a catalyst 4 (three-way catalyst) was obtained. Noble metal supported amounts of this catalyst were 1.18 g/L for Pt and 0.24 g/L for Rh.
Catalysts 5 to 7, 14, 15 and 17: HC-trap-catalysts By use of a similar procedure to that of the catalyst 1, HC-trap-catalysts different in the conditions of the catalyst capacity and the number of meshes were prepared.
Catalysts 8 to 13, 16 and 18 to 20: Three-way-catalysts By use of a similar procedure to that of the catalyst 2, three-way catalysts different in the conditions of the catalyst capacity and the number of meshes were prepared.
Manufacturing of Exhaust Gas Purifying System
Examples 1 to 22, Comparative Example 1

The exhaust gas purifying system (system No. 1) according to the first embodiment, which is shown in FIG. 3, was manufactured by use of each of the catalysts 1 to 20. In this system No. 1, the converter vessel 100 and the converter vessel 200, in which the catalysts were to be accommodated, were provided from the upstream side on the exhaust gas passage 50. Moreover, the converter vessel 100 includes catalyst storage units P1 and P2, and the converter vessel 200 includes catalyst storage units P3 and P4. The catalyst 2 (three-way catalyst) was accommodated in the catalyst storage unit P1, and the catalyst 1 (HC-trap-catalyst) was accommodated in the catalyst storage unit P2. In the catalyst storage unit P3, one three-way catalyst equivalent to the heat capacitor, which was selected among the three-way catalysts shown in a table of FIG. 9, was accommodated. Moreover, in the catalyst storage unit P4, one selected among the HC-trap-catalysts shown in Table 1 was accommodated.

Tables of FIG. 10A to 10D shows types of the catalysts for use in the systems of the examples 1 to 23, and shows conditions and purification performances of the systems. Note that a heat capacity ratio Ht$_0$/Ht in the tables represents a ratio of a heat capacity Ht$_0$ of the first three-way catalyst accommodated in the catalyst storage unit P1, which is located at the uppermost stream of the exhaust gas passage, to a heat capacity Ht of the second three-way catalyst as the heat capacitor accommodated in the catalyst storage unit P3.

Note that each exhaust gas purifying system is provided with an injection valve 72, an air/fuel ratio sensor 73 and oxygen sensors 74 and 75.

Example 23

The exhaust gas purifying system (system No. 2) according to the second embodiment, which is shown in FIG. 5, was manufactured by use of each of the catalysts 1 to 4. In this system No. 2, the converter vessel 100, the converter vessel 201 and the converter vessel 202 were provided from the upstream side on the exhaust gas passage 50. Similarly to the examples 1 to 22, the catalyst 2 (three-way catalyst) and the catalyst 1 (HC-trap-catalyst) were accommodated in the catalyst storage units P1 and P2 of the converter vessel 100, respectively.

Moreover, the catalyst 4 (three-way catalyst) as the heat capacitor was accommodated in the catalyst storage unit P3 of the converter vessel 201, and the catalyst 3 (HC-trap-catalyst) was accommodated in the catalyst storage unit P4 of the converter vessel 202.

Examples 24 and 25

The exhaust gas purifying system (system No. 3) according to the third embodiment, which is shown in FIG. 6, was manufactured by use of each of the catalysts 1 to 4 and 14. In this system No. 3, the converter vessel 100 and the converter vessel 301 were provided from the upstream side on the exhaust gas passage 50. Similarly to the examples 1 to 23, the catalyst 2 (three-way catalyst) and the catalyst 1 (HC-trap-catalyst) were accommodated in the catalyst storage units P1 and P2 of the converter vessel 100, respectively.

The converter vessel 301 includes catalyst storage units P3 to P5. In each of the catalyst storage units P3 and P5, the catalyst 3 (HC-trap-catalyst) or the catalyst 14 (HC-trap-catalyst) was accommodated. In the catalyst storage unit P4, the catalyst 4 (three-way catalyst) as the heat capacitor was accommodated.

Examples 26 and 27

The exhaust gas purifying system (system No. 4) shown in FIG. 7 and the exhaust gas purifying system (system No. 5) shown in FIG. 8 were manufactured by use of each of the catalysts 1 to 4. This system No. 4 includes a converter vessel 302 having three catalyst storage units P6 to P8 similarly to the converter vessel 301, the converter vessel 302 being located downstream of the converter vessel 301 of the system No. 3. The system No. 5 further includes a converter vessel 303 having three catalyst storage units P9 to P11 similarly to the converter vessel 301, the converter vessel 303 being located downstream of the converter vessel 302 of the system No. 4.

In each of the converter vessels 301 to 303, the catalysts were accommodated in the three storage units in order of the HC-trap-catalyst, the three-way catalyst and the HC-trap-catalyst from the upstream side.
Performance Evaluation Performance evaluation was carried out for the exhaust gas purifying systems of the respective examples under the following conditions by the following method.

(1) Durability condition

| | |
|---|---|
| Engine displacement | 3000 cc |
| Fuel | gasoline (Nisseki Dash) |
| Catalyst inlet gas temperature | 650° C. |
| Time of durability | 100 hours |

(2) Vehicle performance test

| | |
|---|---|
| Engine displacement | In-line four-cylinder 2.0 L engine by Nissan Motor Co., Ltd. |
| Method of evaluation | A-bag of LA4-CH of North America exhaust gas testing method |

Results

As shown in tables of FIG. 10A to FIG. 10D, it was confirmed that the cold HC could be purified efficiently in the following manner. Specifically, the HC-trap-catalysts 11 and 12 are provided upstream and downstream of the exhaust system of the engine, respectively, and the three-way catalyst (heat capacitor 30) is arranged therebetween. Particularly, the following ratios are controlled in suitable ranges: i) the ratio Vt/Vh$_2$ of the capacity Vt of the three-way catalyst (heat capacitor 30) to the capacity Vh$_2$ of the HC-trap-catalyst 12 located downstream thereof; ii) the ratio Ht/Hh$_2$ of the heat capacity Ht per unit volume of the three-way catalyst (beat capacitor 30) to the heat capacity Hh$_2$ per unit volume of the HC-trap-catalyst 12 located downstream thereof; iii) the ratio Mt/Mh$_2$ of the number of meshes Mt of the honeycomb carrier of the three-way catalyst (heat capacitor 30) to the number of meshes of the honeycomb carrier of the HC-trap-catalyst 12 located downstream thereof; and iv) the ratio Gt/Gh$_2$ of the geometric surface area Gt of the honeycomb carrier of the three-way catalyst (heat capacitor 30) to the geometric surface area Gh$_2$ of the honeycomb carrier of the HC-trap-catalyst 12 located downstream thereof.

Moreover, when the three-way catalyst (heat capacitor 30) and the HC-trap-catalyst 12 are accommodated in separate converter vessels as in the example 23 using the exhaust gas purifying system No. 2, the temperature increase of the HC-trap-catalyst 12 is reduced more effectively. Therefore, a time difference is enlarged between the cycle of HC adsorption, hold, desorption and purification in the HC-trap-catalyst 11 arranged upstream and the cycle of HC adsorption, hold, desorption, and purification of the HC in the HC-trap-catalyst 12 arranged downstream. Therefore, the purification performance for the desorbed HC can be further enhanced.

Moreover, as in the examples 24 and 25 using the exhaust gas purifying system No. 3, when the HC-trap-catalyst, the three-way catalyst and the HC-trap-catalyst are accommodated in this order in the same converter vessel instead of accommodating the three-way catalyst (heat capacitor 30) and the HC-trap-catalyst 12 in the same converter vessel, a time difference can be obtained between the cycles of HC adsorption, hold, desorption and purification, which occur in the respective two HC-trap-catalysts in the same vessel. Therefore, the purification performance for the desorbed HC can be still further enhanced.

Furthermore, as in the example 26 or 27 using the exhaust gas purifying systems No. 4 and No. 5, respectively, two or three converter vessels are arrayed in line, each accommodating therein the HC-trap-catalyst, the three-way catalyst and the HC-trap-catalyst in this order. Thus, the cycle of HC adsorption, hold, desorption and purification in the HC-trap catalyst is repeated with a time difference from that of others. Therefore, the purification performance for the desorbed HC can be yet further enhanced. Such an effect was confirmed by the evaluation.

As described above, according to the exhaust gas purifying system in accordance with the present invention, the amount and flow rate of the exhaust gas diffused in the adsorbent of the HC-trap-catalyst can be reduced to achieve the delay of the desorption. Simultaneously, timing when the adsorbed HC reaches the temperature of the desorption start and timing when the purifying catalyst layer reaches the temperature of the activation start can be matched. Therefore, the cold HC can be purified efficiently.

The entire contents of Japanese Patent Applications P2001-327428 (filed: Oct. 25, 2001) and P2002-143738 (filed: May 17, 2002) are incorporated herein by reference. Although the inventions have been described above by reference to certain embodiments of the inventions, the inventions are not limited to the embodiments described above. Modifications and variations of the embodiments described above will occur to those skilled in the art, in light of the above teachings. The scope of the inventions is defined with reference to the following claims.

What is claimed is:

1. An exhaust gas purifying system for purifying gas exhausted from an engine, comprising:

a gas passage for the gas exhausted from the engine;

a first three-way catalyst arranged on the gas passage;

a first HC-trap-catalyst arranged downstream of the first three-way catalyst on the gas passage;

a second HC-trap-catalyst arranged downstream of the first HC-trap-catalyst on the gas passage; and a heat capacitor arranged between the first HC-trap-catalyst and the second HC-trap-catalyst on the gas passage, wherein each of the heat capacitor and the second HC-trap-catalyst has a honeycomb carrier, and a ratio Gt/Gh$_2$ of a geometric surface area Gt of the honeycomb carrier of the heat capacitor to a geometric surface area Gh$_2$ of the honeycomb carrier of the second HC-trap-catalyst ranges from 1 to 5.

2. The exhaust gas purifying system according to claim 1, wherein the heat capacitor delays time when temperature of gas entering the second HC-trap-catalyst reaches approximately 150° C. by 10 seconds to 90 seconds as compared with a case where the heat capacitor does not exist.

3. The exhaust gas purifying system according to claim 1, wherein the heat capacitor delays time when an amount of HC desorbed from the second HC-trap-catalyst reaches a peak thereof by 10 seconds to 90 seconds.

4. The exhaust gas purifying system according to claim 1, wherein the heat capacitor is a second three-way catalyst.

5. The exhaust gas purifying system according to claim 4, wherein each of the first HC-trap-catalyst and the heat capacitor has the honeycomb carrier, a number of meshes Mt of the honeycomb carrier of the second three-way catalyst is 600 to 1500 cpsi, and a number of meshes Mh$_2$ of the honeycomb carrier of the second HC-trap-catalyst is 100 to 600 cpsi.

6. The exhaust gas purifying system according to claim 5, wherein a ratio Mt/Mh$_2$ of the numbers of meshes is in a range of 2 to 10.

7. The exhaust gas purifying system according to claim 4, wherein a ratio Vt/Vh$_2$ of a capacity Vt of the second three-way catalyst to a capacity Vh$_2$ of the second HC-trap-catalyst is in a range of 0.25 to 3.0.

8. The exhaust gas purifying system according to claim 4, wherein a ratio Ht/Hh$_2$ of a heat capacity Ht of the second three-way catalyst to a heat capacity Hh$_2$ of the second HC-trap-catalyst is in a range of 0.1 to 3.5.

9. The exhaust gas purifying system according to claim 4, wherein a capacity of the second HC-trap catalyst is 0.05 to 0.75 L.

10. The exhaust gas purifying system according to clam 4, wherein a ratio Hh$_1$/Hh$_2$ of a heat capacity Hh$_1$ of the first HC-trap-catalyst to a heat capacity Hh$_2$ of the second HC-trap-catalyst is more than or equal to 1.

11. The exhaust gas purifying system according to claim 4, wherein the second three-way catalyst is stored singly in a converter vessel.

12. The exhaust gas purifying system according to claim 4, wherein
the second three-way catalyst and the second HC-trap-catalyst are stored in a single converter vessel.

13. The exhaust gas purifying system according to claim 12, wherein
a third HC-trap-catalyst is further stored in the single converter vessel, and the catalysts are arranged in order of the third HC-trap-catalyst, the second three-way catalyst and the second HC-trap-catalyst from an upstream of the gas passage.

14. The exhaust gas purifying system according to claim 13, further comprising:
any of another and other plural converter vessels, each having the third HC-trap-catalyst, the second three-way catalyst and the second HC-trap-catalyst accommodated therein in this order,
wherein any of the one and plural converter vessels are connected downstream of the converter vessel in line.

* * * * *